United States Patent [19]

Yang

[11] Patent Number: 5,883,035

[45] Date of Patent: Mar. 16, 1999

[54] MESOPOROUS SILICOALUMINATE PRODUCTS AND PRODUCTION THEREOF BY CONTROLLED ACID EXTRACTION OF ALUMINUM FROM CALCIUM BENTONITE CLAY

[75] Inventor: Xiaolin Yang, Edison, N.J.

[73] Assignee: Engelhard Corporation, Iselin, N.J.

[21] Appl. No.: 964,737

[22] Filed: Nov. 5, 1997

[51] Int. Cl.$^6$ ..................................................... B01J 21/16

[52] U.S. Cl. ............................... 502/81; 502/83; 502/85; 423/118.1

[58] Field of Search .................................. 502/81, 83, 85, 502/80; 423/118.1

[56] References Cited

U.S. PATENT DOCUMENTS

| | | | |
|---|---|---|---|
| 2,551,580 | 5/1951 | Bond, Jr. | 196/52 |
| 3,901,826 | 8/1975 | Hofstadt et al. | 502/83 |
| 3,944,482 | 3/1976 | Mitchell et al. | 208/120 |
| 4,405,371 | 9/1983 | Sugahara et al. | 106/21 |
| 5,008,226 | 4/1991 | Taylor et al. | 502/81 |
| 5,008,227 | 4/1991 | Taylor et al. | 502/83 |

FOREIGN PATENT DOCUMENTS

| | | |
|---|---|---|
| 201274 B | 4/1982 | Czechoslovakia. |
| 226223 | 2/1986 | Czechoslovakia. |
| 251376 B1 | 3/1988 | Czechoslovakia. |
| 257648 B1 | 2/1989 | Czechoslovakia. |
| 258821 B1 | 4/1989 | Czechoslovakia. |
| 44058 A1 | 1/1982 | European Pat. Off.. |
| 3440514 A1 | 9/1985 | Germany. |
| 4200479 A1 | 7/1992 | Germany. |
| 4330275 A1 | 3/1993 | Germany. |
| 4405876 A1 | 10/1994 | Germany. |
| 4407746 A1 | 9/1995 | Germany. |
| 4438306 A1 | 5/1996 | Germany. |
| 1682347 A1 | 10/1991 | U.S.S.R.. |
| WO 97/21785 | 6/1997 | WIPO .............................. C10G 11/05 |

OTHER PUBLICATIONS

R.E. Grim, "Applied Clay Mineralogy", McGraw–Hill, New York, 1962, p. 307–332.

A. Grenall, "Montmorillonite Cracking Catalyst, X–ray Diffraction", Ind. Eng. Chem., 40 (1948) pp. 2148–2151.

X. Yang, Structure Identification of Intermediate Aluminum Species in USY Zeolite Using High–Resolution and Spin–Lattice Relaxation $^{27}$Al NMR, Phys. Chem., 99 (1995) p. 1276–1280.

X. Yang and R. Truitt Observation and Study of New Tetrahedral Al Sites in $NH_3$–treated, Steamed Zeolites using MAS $^{27}$Al and $^{15}$N n.m.r., Zeolites, 16 (1996) pp. 249–253.

X. Yang and P. Blosser, Location and Bonding of Cations in ETS–10 Titanosilicate Molecular Sieve: A Multinuclear n.m.r. Investigation, Zeolites, 17 (1996) pp. 237–243.

*Primary Examiner*—Michael Lewis
*Assistant Examiner*—Thomas G. Dunn, Jr.
*Attorney, Agent, or Firm*—Inez L. Moselle

[57] ABSTRACT

Disclosed is a process of making mesoporous silico-aluminates from calcium bentonite by controlled extraction of octahedral aluminum under mild condition, by acid, preferably phosphoric acid. The mesoporous silicoaluminates contain only tetrahedral aluminum as the residual aluminum. As the result of the selective removal of the octahedral aluminum, the mesoporous silico-aluminates have several unprecedented properties compared to products produced by conventional processes either by mild acid-activation or by a removal of all the aluminum.

12 Claims, 4 Drawing Sheets

Fresh F2

1 hour 4 hour

Fresh F2

1 hour 4 hour

MESOPOROUS SILICOALUMINATE PRODUCTS AND PRODUCTION THEREOF BY CONTROLLED ACID EXTRACTION OF ALUMINUM FROM CALCIUM BENTONITE CLAY

FIELD OF THE INVENTION

This invention relates to novel mesoporous silicoaluminate products and to a process for making such products by controlled extraction of octahedral aluminum from a calcium bentonite clay by an acid, preferably phosphoric acid, leaving mesoporous silicoaluminate containing tetrahedral aluminum in the solid residue.

BACKGROUND OF THE INVENTION

Calcium bentonite clays, i.e., clay in which the principal exchangeable cation is a calcium ion, are also referred to as sub-bentonites, calcium montomorillonites or calcium smectites. Generally, these are hydrated aluminosilicate crystalline minerals. Usually, magnesium proxies for some of the aluminum in the crystals of the clay. Iron content varies with clays from different deposits.

For many years, selected bentonite source clays have been treated on a commercial scale with acids to leach aluminum from the structure. The acid leaching has been practiced to produce bleaching earths, cracking catalysts and reactive pigments for carbonless copying paper, among other commercial applications. See for example, patents and publications cited in U.S. Pat. Nos. 5,008,226 and 5,008,227.

The starting clays which are used to produce known forms of acid leached bentonites typically contain approximately 20% alumina (based on the dry weight). The aluminum in bentonites are in octahedral and tetrahedral bonding structures. Acid dosages of about 40–50 gm of 96% $H_2SO_4$/100 gm clay are typically used. Alkaline earth and alkali metals are removed. The clays are usually leached to a residual aluminum content in the range of about 10–15 wt. %. The extent of leaching varies inter alia with the intended use of the leached clay. However, in general practice, both octahedral and tetrahedral aluminum remain in the solid residue which, when studied by XRD, exhibits lines characteristic of the clay crystals. The acid treated clay is invariably washed to remove soluble salts and entrained acid. While sulfuric acid is usually the acid of choice, other acids such as phosphoric and citric acids have been proposed.

It is known that repeated sulfuric acid leaches, resulting in extractions in excess of those used in the typical commercial prior art practice, can produce siliceous residues with essentially no aluminum. The porosity (surface area and pore volume) can be severely destroyed by such practice. This may explain why exhaustive leaching to remove virtually all aluminum has not been practiced commercially.

Acid-activated bentonites have been used as reactive pigments for several decades for paper products, in particular for use as a porous pigment in carbonless copy paper manufacture. The acid-leached bentonite was used with normally colorless leuco dyes to develop colored images. In the case of U.S. Pat. No. 4,405,371, Sugahara et al., proposed to use a relatively highly leached bentonite. The bentonite was leached by $H_2SO_4$ or HCl to such degree that $SiO_2$ content was about 82–96.5 wt %, preferably 85–95 wt %. The acid-leached bentonite was characterized by its loss of X-ray crystallinity, regardless of its aluminum content or structure. However, it was noted that the acid-leached bentonite had a relatively low BET surface area, about 180 $m^2$/g.

The use of acid-activated bentonite as petroleum cracking catalysts was proposed in the 1930s. The mild acid-leaching, usually using $H_2SO_4$ or HCl, generated porosity and acidity which were required for the catalysis. After the acid-leaching, part of the clay crystallinity was maintained, and most aluminum still remained in the structure, about 10–15 wt. % expressed as $Al_2O_3$. It was found that the catalytic activity was reduced after more aluminum was removed.

The following references are nonlimiting examples of references that relate to the preparation of acid-leached bentonites and to their use in catalytic cracking applications:

R. E. Grim, "Applied Clay Mineralogy", McGraw-Hill, New York, 1962, p. 307–332.

G. R. Bond, "Acid-treated clay catalyst for cracking hydrocarbons", U.S. Pat. No. 2,551,580 (1951).

A. Grenall, "Montomorillonite cracking catalyst, X-ray diffraction", Ind. Eng. Chem., 40 (1948) 2148–2151.

U.S. Pat. No. 3,944,482, Bruce R. Mitchell et al., "Process for the Cracking of High Metals Content Feedstocks".

Since the discovery of zeolites in the 1960s, the role of acid-activated bentonite in refinery cracking has substantially decreased except for some uses such as a matrix constituent. For example, in Mitchell et al patent (U.S. Pat. No. 3,944,482) acid-leached bentonite was used as matrix for high metals tolerant resid catalysts. Mitchell et al found that the acid-activated bentonite matrix must meet two requirements: (1) it must have a high aluminum content above 20 wt %, and (2) its average pore diameter must be larger than 100 A.

SUMMARY OF THE INVENTION

One aspect of the present invention comprises a method for manufacturing mesoporous particulate silico-aluminate from calcium bentonite clay minerals containing octahedral and tetrahedral aluminum in the framework of the mineral. The process comprises mixing the calcium bentonite mineral with sufficient acid, preferably phosphoric acid, to leach substantially all of the octahedral aluminum while leaving at least a predominating amount, preferably all, of the tetrahedral aluminum.

The term "mesoporous" as used herein refers to a pore diameter (volume average) of about 20–100 Å, measured by $N_2$ adsorption.

The concentration of the acid is in the range of 0.5 to 8M, preferably at least 1.0M and less than 6.0M, and, most preferably in the range of 2.0 to 4.0M. Expressed in wt %, the acid concentration is in the range of 5 to 86 wt %, preferably at least 10 and less than 60 and, most preferably in the range of 20 to 40 wt %. Temperature is preferably in the range of 20° to 200° C., most preferably 70° to 100° C.

The leached silicoaluminate residue is washed, preferably with water, until the residual acid is below 1.0% weight, expressed as $P_2O_5$, (based on the anhydrous weight of the solid). After leaching, the resulting mesoporous residues contain 4.0 to 0.5 weight % $Al_2O_3$ (based on the anhydrous weight) and have surface areas from 300 to 730 $m^2$/g, depending on the starting clays.

Preferably, the characteristic XRD lines of bentonite are absent in the silicoaluminate product. Only two broad peaks at about $2\theta=2.2$ and 23° are observable, which are due to the amorphous mesoporous silicoaluminates.

DESCRIPTION OF PREFERRED EMBODIMENTS

Figure 1A:
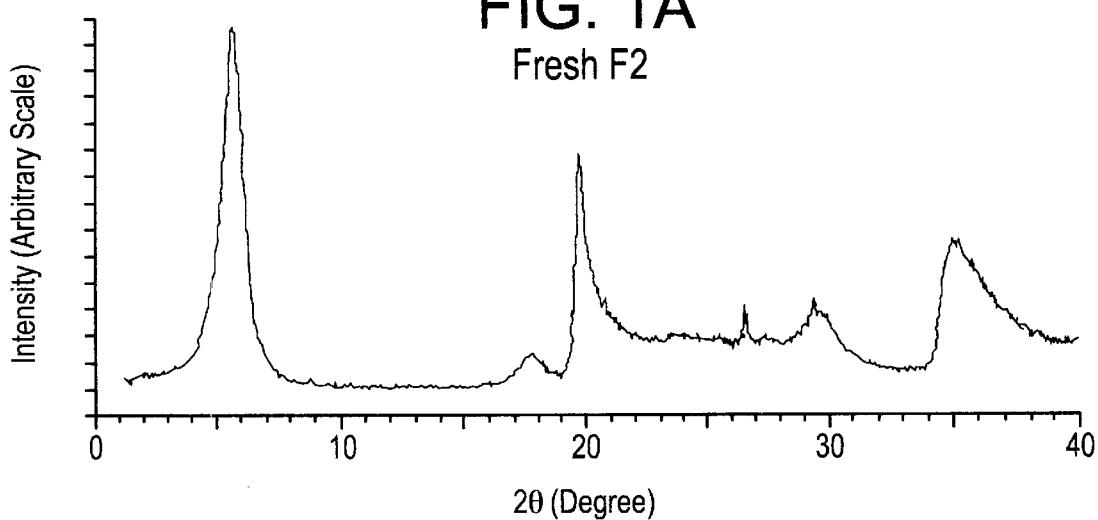
FIG. 1 displays small-angle XRD powder patterns of fresh and $H_3PO_4$-leached Cheto clay. Notice the disappearance of clay peaks and the formation of the mesoporous silicoaluminate (MEPSA) peaks as leaching time increases.

In one embodiment of this invention novel silicoaluminate products are produced. These products have a remarkably high hydrothermal stability and a high BET surface area, typically about 300–500 m$^2$/g, a pore volume in the range of 0.4 to 0.8 cc/g, and a pore diameter in the range of 30–80 Å units. Suitable source clays for these ultra highly stable products are commercially available as Mississippi or Fowlkes clay. These stable mesoporous silicoaluminates material can be used both as a cracking catalyst and a matrix for a zeolitic resid cracking catalyst.

Such porous materials are used to improve the gasoline yield and increase the bottoms upgrading, but at no significant penalty of hydrogen and coke. They also tolerate high metal content in the feedstock. This is achieved by the extensive, but controlled acid-leaching, which generates much higher porosity and removes all the octahedral aluminum, but keep all the tetrahedral aluminum.

In other preferred embodiments of the invention, the products are mesoporous silicoaluminates with ultra high surface area (up to 730 m$^2$/g) and brightness (typically about 90% using the TAPPI procedure). The mesoporous silicoaluminates may find many applications such as reactive pigments for carbonless copy paper and ink-jet printing as well as desiccants and adsorbents. Mesoporous silicoaluminates derived from bentonite, such as the calcium bentonites known as Cheto (Arizona) clays, can be processed to provide materials that are not only ultra highly porous and bright, but also have favorable water adsorption isotherms for use as desiccants. Surface areas of such products are typically about 600 to 730 m$^2$/g; pore volume in the range of 0.4 to 0.8 cc/g and pore range in the range of 30–60 Angstrom units.

In practice of this invention, the range of phosphoric acid concentration is preferably 1–6M when producing high BET surface area products at reasonable leaching time at 95° C. Especially preferred is the use of 2–4M H$_3$PO$_4$ when producing high surface area products using 2–10 hours leaching time at 95° C.

Generally the minimum acid concentration is about 1.0 M; using lower concentration leaching time may be excessive even at 100° C. The maximum concentration is about 6.0M. Use of stronger acid can result in a reaction that is too vigorous to control.

Optimum temperature varies with the concentration of the acid. Preferred leaching temperature is in the range 70°–100° C. Especially preferred are temperatures in the range 90° to 100° C.

Mesoporous silicoaluminate products of the invention may be prepared by batch or continuous operations, preferably employing continuous agitation either by mechanical stirring or by bubbling steam into the system.

After reaction is complete, the mesoporous silicoaluminate is separated from the bulk of the liquid by known means such as filtration or centrifugation. The residues are washed, preferably with deionized water, to reduce H$_3$PO$_4$ residual to below 1.0 wt %, expressed by P$_2$O$_5$.

Before acid-leaching, clays can be processed by drying and crushing into powder. Typically particle size of the powders is about 10–40 micrometer in diameter.

Suitable but nonlimiting sources of clay useful in practice the invention have the following composition (on a dry weight basis):

|  | Source Clay (wt %): | |
| --- | --- | --- |
|  | Cheto (Arizona) | Fowlke (Mississippi) |
| SiO2 | 66.7 | 66.4 |
| Al2O3 | 19.9 | 19.4 |
| CaO | 3.4 | 3.6 |
| MgO | 6.1 | 3.6 |
| Fe2O3 | 1.9 | 5.7 |
| TiO$_2$ | 0.3 | 0.9 |
| K$_2$O | 0.2 | 0.8 |
| Na$_2$O | 0.1 | 0.2 |

Clay mineralogy: XRD powder diffraction patterns indicate that Fowlkes and Cheto clays are of typical layered montmorillonite smectite structure except that Fowlke has a higher impurity content. The main smectite peaks of as-received clays are located at

| 2 Theta (degree) | Intensity |
| --- | --- |
| 5.8 | vs |
| 17.4 | w |
| 20.0 | s |
| 29.5 | w |
| 35.2 | s |

In one especially preferred embodiment of the invention a mesoporous silicoaluminate material, dubbed MEPSA-1, with high surface areas about 730 m$^2$/g, is synthesized. The high surface area can be obtained only when H$_3$PO$_4$ acid and a special smectite clays are used. Such bentonite clays are mined in the Cheto deposit and are supplied under the trade name F2 by Engelhard Corporation. To our knowledge, products obtained by practice of this invention using such clays have the highest surface areas of acid-leached bentonites ever achieved. Both XRD and $^{29}$Si NMR provide evidence that the acid-leaching has fundamentally transformed the layered bentonite into an amorphous silica-like structure. The resulting products, designated MEPSA-1 in the illustration examples is no longer a bentonite. The high surface area is related to the removal of aluminum in the clay. However, a maximum surface area is obtained only when some or all the tetrahedra aluminum (Al$_2$O$_3$ 0.5–2.0 wt. %) remains in the structure. A complete removal of aluminum leads to a destruction of some of the porosity.

MEPSA-1 can be made by stirring as-mined (dried and pulverized) F2 bentonite in an aqueous phosphoric acid solution. We found that the same surface area can be obtained by different combinations of the three reaction variables: acid concentration, reaction time, and temperature. After the acid-treatment, the solid is filtered, washed, and dried without further pretreatment. In a typical laboratory procedure a slurry with a F2 clay/3M $H_3PO_4$ acid ratio of 1g/10 ml is made, stirred at 95° C. for 2.5 hours, filtered, washed three times with deionized water, and dried at 105° C. overnight.

Figure 1B:
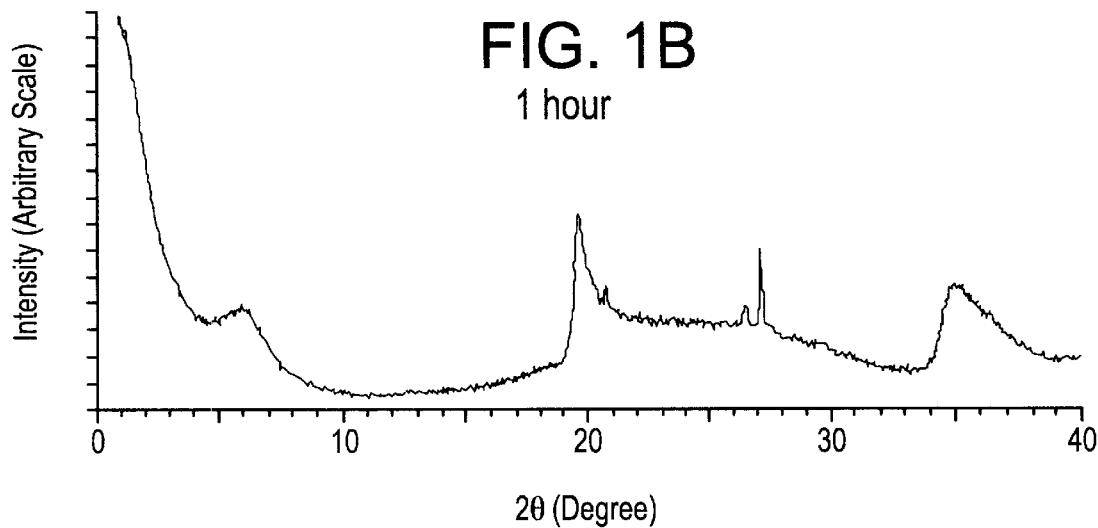
Figure 1C:
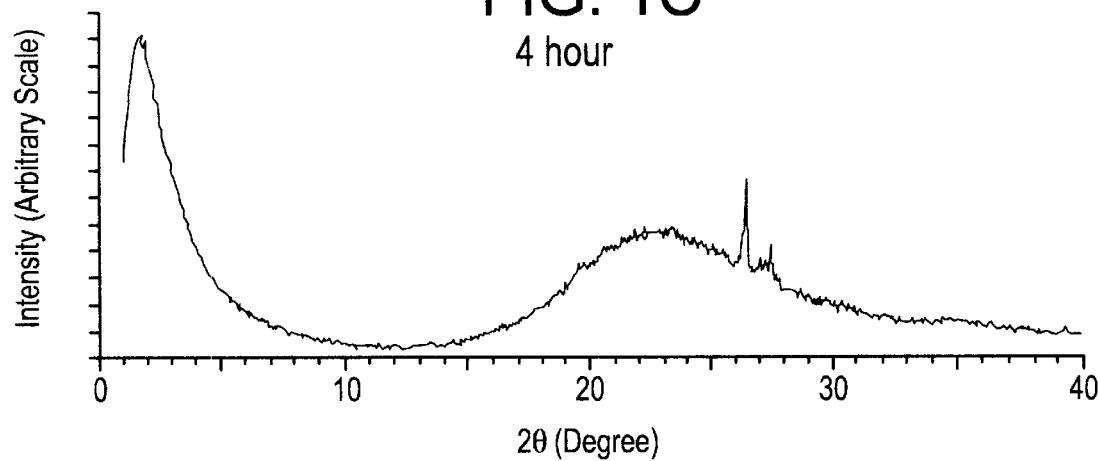
Figure 2A:
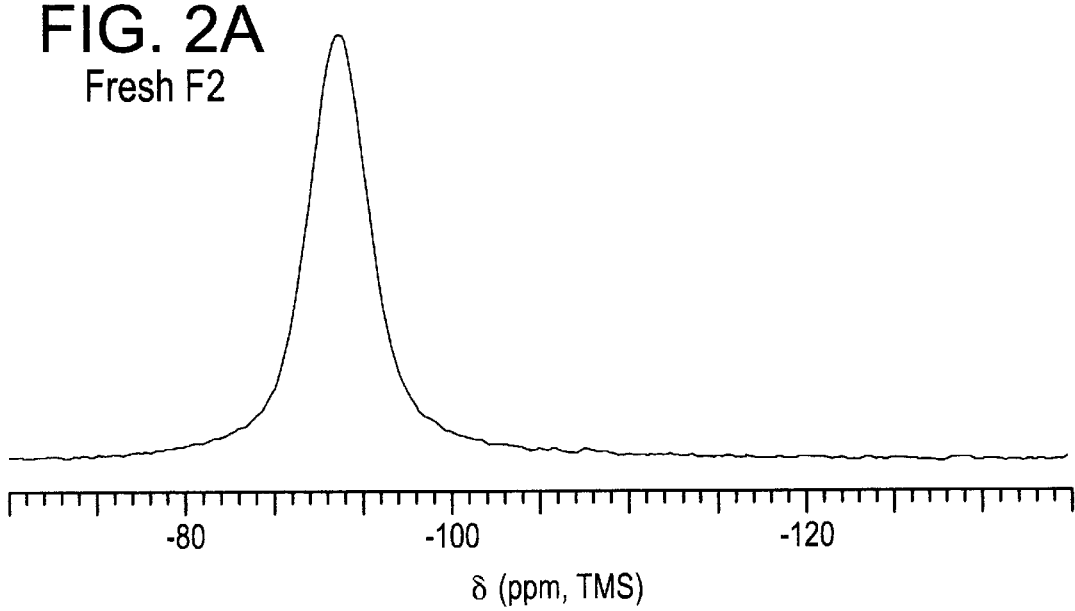
FIG. 2 shows $^{29}$Si MAS NMR of fresh and H$_3$PO$_4$-leached Cheto clay. Notice the disappearance of the clay Si—O—Al bond and the formation of MEPSA Si—O—Si and Si—O—OH bonds as leaching time increases.
Figure 2B:
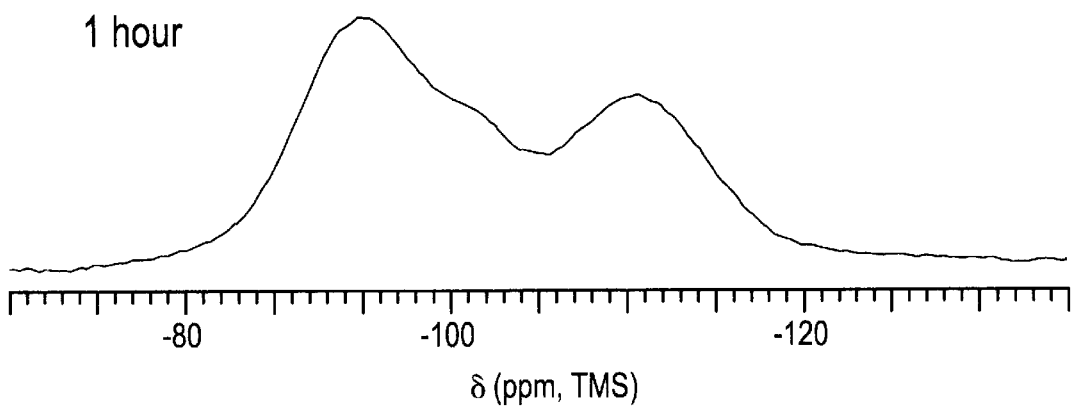
Figure 2C:
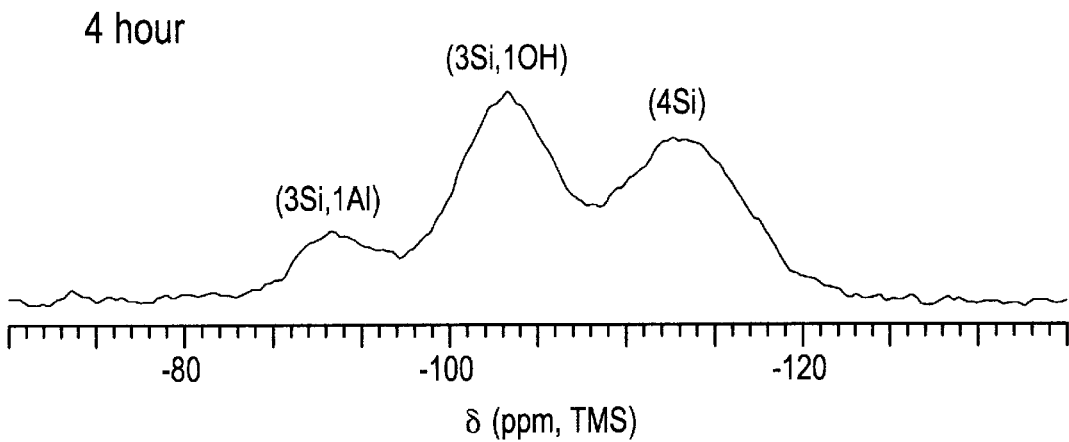

FIG. 1 shows XRD powder patterns of $H_3PO_4$-leached F2 as a function of reaction time. As the acid-treatment time increases, the signature peaks of bentonite (at about $2\theta=5.8$, 20 and 35°) gradually disappear, and a new peak is formed at 2.18° which corresponds to a very large d-spacing of about 40.5 Å. $N_2$ adsorption BET surface area (727 $m^2/g$) and average pore size (42 Å in diameter) of MEPSA-1 is entirely consistent with the large XRD d-spacing value. Furthermore, as shown in FIG. 2, $^{29}$Si MAS (magic-angle spinning) NMR indicates that the acid-treatment has almost completely changed the local structure of bentonite. Fresh bentonite is characterized by its single silicon peak at about −93 ppm due to silicon sites that are connected to three other Si and one Al (or Mg) atoms through oxygen bridges (FIG. 2-a). After the acid-treatment, shown in FIG. 2-b and -c, the Si—O—Al bond is almost completely replaced either by a Si—O—OH (−103 ppm) bond or a Si—O—Si bond (−113 ppm). Only about 6% of original signal is left. Thus, both XRD and NMR data are definitive that MEPSA-1 is no longer a bentonite. Chemical analysis data also indicate that the acid-treatment has significantly reduced alumina content from 20 to 1.3 wt. % and increased the Si content from 67 to 95 wt. %.

X-ray diffraction evaluations reported herein were performed on a Philips APD 3720 diffractometer. The instrument settings are:

Voltage: 45 K√
Current: 40 MA
Radiation: Cuα 1.5406 Å
Divergency slit: automatic compensator
Receiving slit: 0.2 mm
Monocromator: graphite
Scan range (2θ): 1°–40°
Step size 0.04°
Count time: 2 sec/step Solid-state nuclear magnetic resonance (NMR) was used to determine the local structure of the starting bentonite clays and the end silica products. This method is particularly useful in determining local atomic bonding structures in the materials. All the high resolution NMR spectra were taken from a Varian Unity-400 MHZ spectrometer at room temperature under a so-called magic angle spinning (MAS) condition.

The aluminum spectra were taken using a Doty 5mm probe with MAS at about 11 kHz spinning speed. The spectra were referenced to a 1.0M aluminum nitrate aqueous solution. In order to further eliminate the quadrupolar broadening associated with $^{27}$Al nucleus, a short RF excitation pulse, 0.5 µs, was used and the samples were moisturized at 80% humidity for at least 24 hours before the analysis. These conditions had been established in literature. Reference is made to the following papers and the references therein:

X. Yang, Structure identification of intermediate aluminum species in USY zeolite using high resolution and spin-lattice relaxation $^{27}$Al NMR, J. Phys. Chem., 99 (1995)1275.

X. Yang and R. Truitt, Observation and study of new tetrahedral Al sites in NH3-treated, steamed zeolites using MAS $^{27}$Al and $^{15}$N NMR, Zeolites, 17 (1996) 249.

The silicon spectra were acquired using a Chemagnetics 7.5 mm probe with MAS at about 5 kHz. A 7.0 µs excitation pulse and 40 s recycle time were used. The spectra were referenced to tetramethyl silane (TMS). The detailed acquisition conditions can be found in the following publication:

X. Yang and P. Blosser, Location and bonding of cations in ETS-10 titanosilicate molecular sieve: A multinuclear NMR investigation, Zeolites, 17 (1996) 237.

The chemical composition analysis was performed with a standard X-ray florescence technique. The elemental composition was based on a volatile free weight basis (1000° C.). For all the analyzed elements of the clays and the silicon in MEPSA, the accuracy is within ±0.1 wt %. For the low aluminum residual in MEPSA, the accuracy is within ±0.5 wt %.

The water adsorption isotherms were analyzed using a TGA (thermal gravametric analysis) method. The samples were dried at 120° C. before the analysis. Each measurement point represents the amount of water gained after an equilibrium is reached under the specific relative humidity.

The BET surface area, pore volume, and pore size were determined by nitrogen gas adsorption at liquid nitrogen temperature, using either of two automated instruments: Quantachrome® Autosorb-6 or Micrometrics® ASAP2400. The samples were heated at 250° C. under vacuum for at least 6 hours before the analysis. The sample weight was obtained on a dried sample. The surface area was obtained by B.E.T. method with 39 relative pressure points. The pore volume represents the total pore volume with pore radius less than 1000 Å.

TAPPI brightness and yellowness were measured using a Technidyne-S4M and Technidyne-MicroTB1C instrument, respectively. The TAPPI brightness is also referred to as GE or Germ brightness. The samples were ground to 325 mesh for the analysis. The instruments were calibrated against the manufacturer's master instruments. A sample of fully calcined kaolin sample supplied by Engelhard Corporation was used as a reference.

The abrasion was measured using an Einlehner abrasion apparatus. An aqueous slurry containing 15 wt % solids and 87,000 revolution of abrasion (equivalent of 40 minutes) were used.

EXAMPLES

The following examples demonstrate the uniqueness of the synthesis of various mesoporous silicoaluminates. Unless noted otherwise, the starting clay/acid slurry ratio was 1 g/10 ml. After the reaction, the slurry was filtered, washed three times, and dried at 105° C. overnight.

Example 1

Table 1 shows that, under the same acid-treatment conditions (3M $H_3PO_4$ 95° C.), of various bentonite, attapulgite, metakaolin, and mica only F2 bentonite clay (Cheto) gives a significantly high surface area. The unique behavior of F2 towards the acid-leaching may be related to its favorable structure, such as its low iron content.

Example 2

Table 2 shows that, for the same F2 clay, acid concentration, reaction time and temperature all have a strong effect on the properties of the final products. With other conditions equal or similar, the surface areas of the acid-leached bentonites follow the order of $HCl<H_2C_2O_4<H_2SO_4<H_3PO_4$, Phosphoric acid gives the highest surface area possibly due to a favorable thermodynamic attendance of forming aluminum phosphate in solution. As shown in Table 2, the high surface area of MEPSA-1 is directly related to the removal of aluminum in the structure. However, the maximum surface area is obtained only when the tetrahedral aluminum remains in the structure. A complete removal of aluminum leads to a destruction of some of the porosity. This is one of the principal features of this invention.

Example 3

Figure 3:
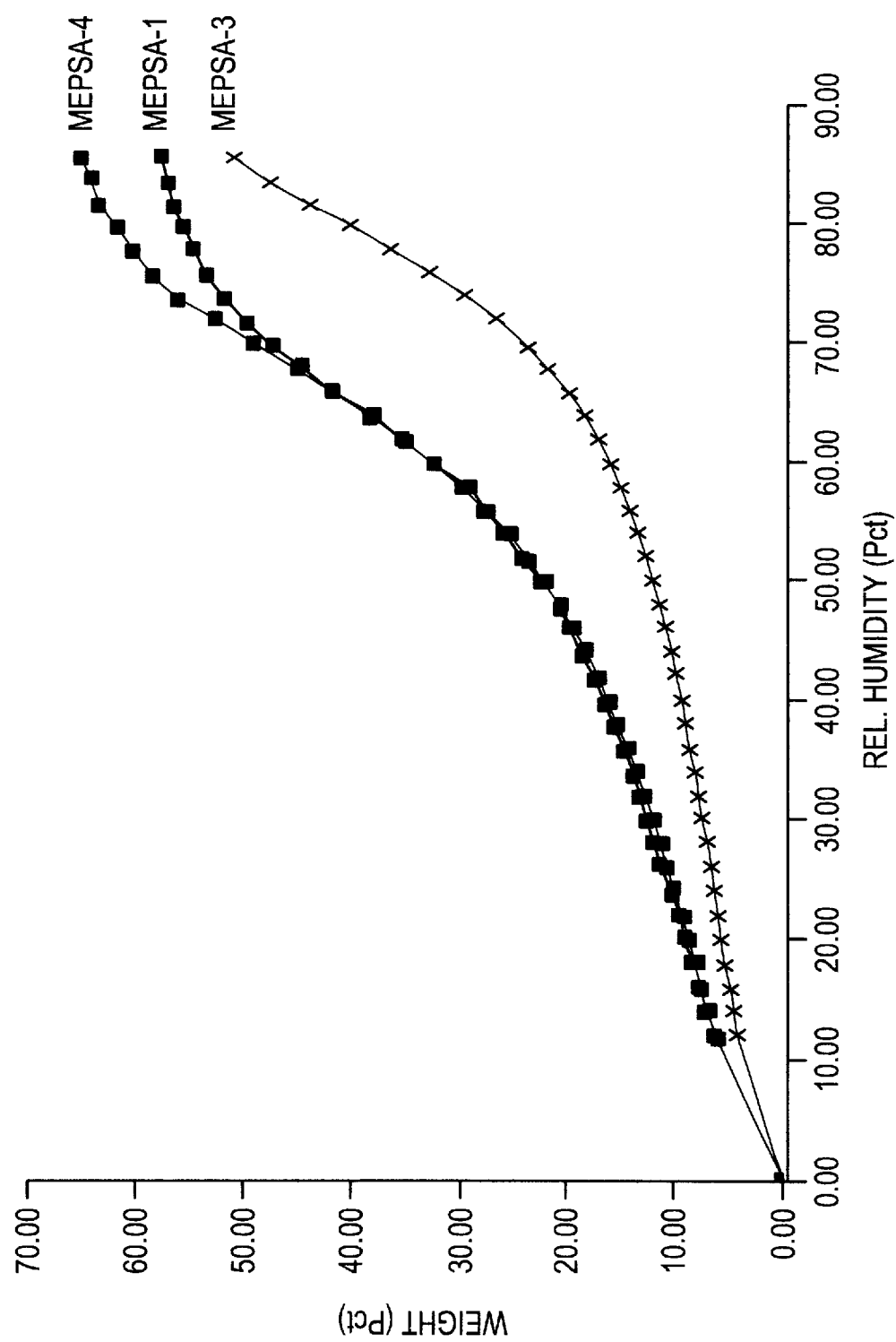
FIG. 3 shows water adsorption isotherms of MEPSAs at 25° C. All products have very high water adsorption capacity.

Because of its high porosity and strong adsorption sites associated with the residual tetrahedral aluminum, MEPSA-1 has very high water adsorption capacity. FIG. 3 shows the water adsorption isotherm of MEPSA-1 at room temperature. The MEPSA-1 sample was obtained by 3M $H_3PO_4$-leaching for 2.5 hours at 95° C. The high water adsorption capacity, e.g., 55 wt % of water at 80% relative humidity, indicates that MEPSA-1 is a promising desiccant.

Example 4

In this example, extruded pellets of Cheto clay were used to react with 3M $H_3PO_4$ at 95° C. for 2.5 hours. In the previous examples, powdered Cheto clay was used. The pellets were ⅛ inch diameter and 1 to ½ inch long. The ratio of pellets to acid was about 1 g/10 ml. After the reaction, a small amount of solid residual matter remained which had the appearance of broken beads and had a diameter of about ⅛–1/16 inch. The fines in the liquid slurry phase were filtered, washed as described herein, and dried, as described hereinabove.

The material was designated as MEPSA-4. The general properties of MEPSA-4 from the pellets were found to be similar to MEPSA-1 from the powder. For example, the product had a BET surface area of 720 m²/g, pore volume of 0.64 cc/g, pore diameter of 35 Å, aluminum content of 0.7 wt %, TAPPI brightness of 87, and TAPPI yellowness of 3.4. The average particle size of the pellet-derived MEPSA-4 was smaller than the powder-derived MEPSA-1, 20 vs. 40 $\mu$m. The water adsorption capacity of MEPSA-4 was also higher than MEPSA-1. See FIG. 3.

TABLE 1

Effect of Starting Clay on Porosity and Elemental Contents

| Clays | Type | Time (hr) | BET (m²/g) | $SiO_2$ (wt %) | $Al_2O_3$ (wt %) |
|---|---|---|---|---|---|
| F2[a] | bentonite | 1 | 608 | 80 | 14 |
| | | 2 | 692 | 91 | 5.7 |
| | | 4 | 702 | 95 | 1.3 |
| | | 6 | 666 | 97 | 1.0 |
| F-100[a] | bentonite | 1 | 240 | 71 | 17 |
| | | 2 | 380 | 75 | 15 |
| | | 3 | 406 | 77 | 13 |
| | | 5 | 442 | 82 | 10 |
| | | 8 | 430 | 88 | 6.5 |
| Ald-B[b] | bentonite | 3 | 203 | 75 | 17 |
| Ald-K-10[c] | bentonite | 3 | 307 | 85 | 9.5 |
| Atta-60[d] | attapulgite | 4 | 307 | 89 | 3.5 |
| MK[e] | metakaolin | 1 | 314 | 87 | 9.0 |
| | | 3 | 277 | 87 | 7.6 |
| | | 5 | 306 | 89 | 7.8 |
| KMG[f] | mica | 2 | 22 | 5S | 32 |
| | | 4 | 20 | 55 | 31 |

[a]Bentonite clays supplied by Engelhard Corporation.
[b]Aldrich commercial Na-bentonite.
[c]Aldrich commercial K-bentonite.
[d]Engelhard attapulgite clay.
[e]Engelhard metakaolin clay.
[f]KMG comrnercial mica.

TABLE 2

Effect of Acid type on Porosity and Chemical Contents

| Acid | Time (hr) | BET (m²/g) | $SiO_2$ (wt %) | $Al_2O_3$ (wt %) |
|---|---|---|---|---|
| 3M $H_3PO_4$ | 1 | 608 | 80 | 14 |
| | 2 | 692 | 91 | 5.7 |
| | 4 | 702 | 95 | 1.3 |
| | 6 | 666 | 97 | 1.0 |
| 1M $H_2SO_4$ | 1 | 296 | 73 | 18 |
| | 2 | 314 | 74 | 18 |
| | 4 | 596 | 84 | 11 |
| | 6 | 629 | 88 | 8.0 |
| | 8 | 539 | 97 | 0.9 |
| 2M $H_2C_2O_4$ | 1 | 236 | 70 | 18 |
| | 3 | 410 | 73 | 15 |
| | 6 | 521 | 83 | 8.2 |
| 6M HCl | 1 | 434 | 81 | 13 |
| | 2 | 481 | 93 | 4.5 |
| | 4 | 403 | 97 | 1.2 |
| | 6 | 364 | 98 | 0.8 |

Example 5

This example focuses on procedures for improving the brightness of mesopored silicoaluminates from Cheto clay, especially those intended for use in the paper industry. The effect of starting clays, the types of acids and other leaching conditions were examined. A possible correlation between the brightness and the porosity and composition of mesoporous silicoaluminates was investigated.

Example 5a Effect of starting clays

Table 3 shows that, under similar acid-treatment conditions (3M $H_3PO_4$,/95° C.), of various bentonite, attapulgite, and mica clays, only F2 bentonite clay gives a high brightness and low yellowness that is suitable for some paper applications. The unique behavior of F2 is probably due to its low initial $Fe_2O_3$ (1.9 wt %) and $Al_2O_3$ (19.9 wt %) contents, shown in Table 4.

Example 5b Effect of acid

Table 5 summarizes the porosity, brightness, yellowness, and abrasion data of four mesoporous silicoaluminate samples obtained using both mineral acids, $H_3PO_4$, $H_2SO_4$, and HCl, and an organic acid, $H_2C_2O_4$. The data indicate that:

1. All the acids are effective in obtaining high brightness that is suitable for paper coating application, though the reaction conditions are different for each acid;

2. With an equal or similar brightness, the BET surface areas are significantly different from one sample to another, indicating there may not be a correlation between the porosity and the brightness. The porosity has been maximized by changing the reaction time. The wide range of the porosity obtained by applying different acids allows one to fine-tune the mesoporous silico-aluminates to match a specific requirement for paper coating.

3. Based on two measurements, if was found that mesoporous silicoaluminates has a relative low Einlehner abrasion (7–13), which is very important for paper coating.

4. Although the high brightness is related to a low $Al_2O_3$ and $Fe_2O_3$ content, there seems no direct correlation between chemical composition and brightness. For example, in spite of differences in the $Al_2O_3$ and $Fe_2O_3$ content among the first three samples in Table 6 (3M $H_3PO_4$, 3M $H_2SO_4$ and 6M HCl), their brightnesses are very similar. This is again indicated by the two H₂SO₄ samples which have quite similar composition but very different brightnesses, and by the two H₂C₂O₄ samples which have similar brightnesses but quite different Al₂O₃ and Fe₂O₃ content.

5. The mesoporous silicoaluminate obtained by H₂C₂O₄-leaching gives an unusually high brightness at a relatively high Al₂O₃ and Fe₂O₃ content. As shown in Table 6, a change of acid concentration significantly changes the composition, but not the brightness. It was also noticed that Ca content in the two H₂C₂O₄-leached samples is high. It was concluded that this must be due to the CaC₂O₄ precipitate formed by the reaction, $$Ca^{+2} + C_2O_4^{-2} \rightarrow CaC_2O_4$$

Like CaCO₃ which is commonly used in the paper coating, CaC₂O₄ may contribute in part to the high brightness. For this reason, the special mesoporous silicoaluminate from H₂C₂O₄-leached Cheto clay was designated MEPSA-2.

TABLE 3

Effect of Starting Clay on Porosity and Brightness

| Clays | Type | Time (hr) | BET (m²/g) | Brightness (TAPPI) | Yellowness Index |
|---|---|---|---|---|---|
| F2 | bentonite | 4 | 702 | 83.5 | 3.4 |
| F-100[a] | bentonite | 8 | 430 | <70 | [f] |
| Ald-B[b] | bentonite | 3 | 203 | <70 | [f] |
| Ald-K-10[c] | bentonite | 3 | 307 | <70 | [f] |
| Atta-60[d] | attapulgite | 4 | 307 | <70 | [f] |
| KMG[e] | mica | 4 | 20 | <70 | [f] |

[a]Engelhard bentonite clay mined at Mississippi.
[b]Aldrich commercial Na-bentonite.
[c]Aldrich commercial K-bentonite.
[d]Engelhard attapulgite clay.
[e]KMG commercial mica.
[f]data not measured.

TABLE 4

Elemental Compositions (wt %) of Starting Clays

| Composition | F2 | F-100 | Ald-B | Ald-K-10 | Att-60 | KMG |
|---|---|---|---|---|---|---|
| SiO₂ | 66.7 | 64.4 | 67.6 | 76.6 | 64.9 | 51.8 |
| Al₂O₃ | 19.9 | 19.4 | 20.6 | 15.2 | 11.3 | 33.9 |
| Fe₂O₃ | 1.9 | 5.7 | 4.0 | 3.1 | 3.7 | 1.9 |
| MgO | 6.1 | 3.6 | 2.5 | 1.4 | 11.1 | 0.7 |
| CaO | 3.4 | 3.6 | 1.2 | 0.2 | 4.9 | 0.0 |
| TiO₂ | 0.3 | 0.9 | 0.2 | 0.6 | 0.5 | 0.5 |
| K₂O | 0.2 | 0.8 | 0.4 | 1.9 | 1.3 | 9.6 |
| Na₂O | 0.1 | 0.2 | 2.1 | 0.4 | 0.1 | 0.5 | a: All the data are based on volatile-free weight.

TABLE 5

Porosity, Brightness and Abrasion of MAPSA

| Acid | Time (hr) | BET (m²/g) | Brightness (TAPPI) | Yellowness Index | Abrasion (Einlihner) |
|---|---|---|---|---|---|
| 3M H₃PO₄/95° C. | 4 | 702 | 83.5 | 3.3 | 13 |
| 6M HCl/95° C. | 6 | 362 | 84.9 | 3.4 | [a] |
| 3M H₂SO₄/95° C. | 5 | 325 | 86.9 | 3.2 | 7 |
| 2M H₂C₂O₄/95° C. | 6 | 521 | 89.7 | 2.4 | [a] |

[a]data not measured

TABLE 6

Chemical Composition and Brightness of MEPSA

| Acid | Brightness (TAPPI) | Yellowness Index | SiO₂ wt % | Al₂O₃ wt % | Fe₂O₃ wt % | CaO wt % |
|---|---|---|---|---|---|---|
| 3M H₃PO₄/4 hr/95° C. | 83.5 | 3.3 | 95 | 1.3 | 0.52 | 0.11 |
| 6M HCl/6 hr/95° C. | 84.9 | 3.4 | 98 | 0.7 | 0.07 | 0.00 |
| 3M H₂SO₄/5 hr/95° C. | 86.9 | 3.2 | 96 | 0.6 | 0.04 | 0.15 |
| 1M H₂SO₄/8 hr/95° C. | 76.6 | 7.0 | 97 | 0.9 | 0.07 | 0.00 |
| 2M H₂C₂O₄/6 hr/95° C. | 89.7 | 2.4 | 83 | 8.2 | 0.69 | 3.80 |
| 3M H₂C₂O₄/6 hr/95° C. | 87.0 | 2.6 | 94 | 0.9 | 0.08 | 3.30 |

Example 6–9 shows the synthesis and properties of MEPSA-3 and its properties. MEPSA-3 can be synthesized either from the as-mined clay (F100) or from a mildly leached-activated bentonite (F160) with both mineral or organic acids. The removal of the octahedral aluminum while retaining the tetrahedral aluminum brings not only high porosity, but also results in unique stability and acidity which are critical for commercial applications such as heavy oil cracking.

Example 6

1.5 kg of F100 clay was added into 15 liters of 3M H₃PO₄ aqueous solution. After a reaction at 95° C. for 8 hours with stirring, the slurry was filtered and washed with deionized water three times and dried at 105° C. overnight. The resulting material was dubbed MEPSA-3.

MEPSA-3 has very high thermal and hydrothermal stability. TGA/DTA profiles do not show any structural changes at a temperature up to 1000° C. Even under severe steaming conditions, 1450° F. for 4 hours with 90% water partial pressure, considerable BET surface area, 204 m²/g, survives. The pore volume is decreased from 0.76 to 0.61 cc/g while the pore diameter increased from 76 to 120 Å. The high hydrothermal stability of MEPSA-3 is of special importance to applications such as FCC bottom upgrading since it provides the stable large pores for cracking the large heavy oil molecules. Most currently available mesopored silicas or zeolites lose their porosity and/or acidity under these conditions.

Figure 4:
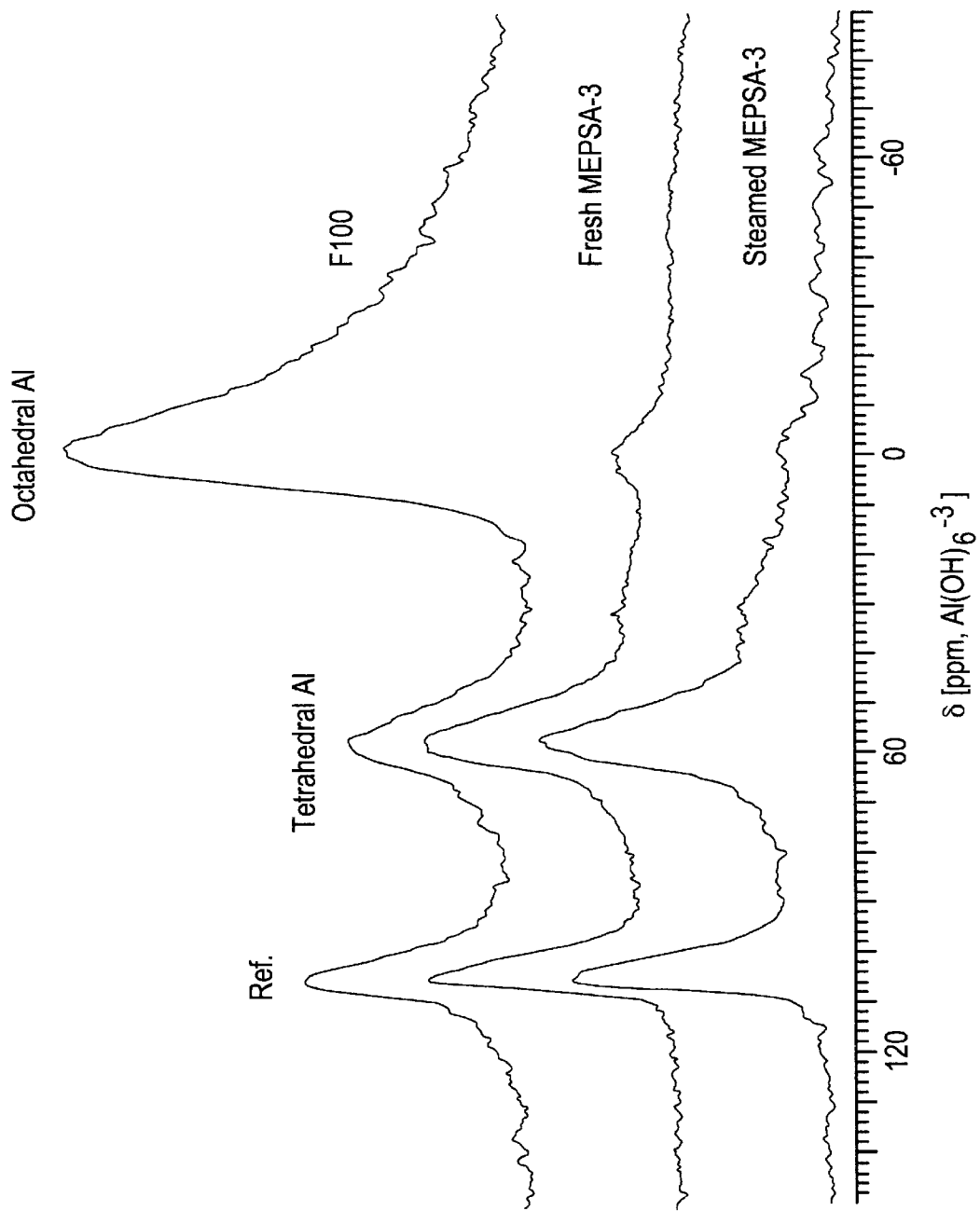
FIG. 4 displays $^{27}$Al MAS NMR of Fowlke clay and the fresh and steamed MEPSA-3 obtained therefrom. For the starting clay, most aluminum is octahedral. H$_3$PO$_4$ leaching removes almost all the octahedral Al and keeps the tetrahedral Al intact. The tetrahedral Al has very high hydrothermal stability.

One of the most characteristic properties of MEPSA-3 is its acid sites distribution and stability as compared to the starting clay. FIG. 4 shows ²⁷Al NMR spectra of F100 and fresh and steamed MEPSA-3. For F100, there are two peaks at 57 and −1 ppm due to tetrahedral and octahedral aluminum sites, respectively. For fresh MEPSA-3, almost all the octahedral sites are removed by the acid-leaching. More interestingly, steaming does not significantly reduce the intensity of the tetrahedral sites. This indicates that the tetrahedral Al sites in MEPSA-3 are extremely stable. The existence of very stable tetrahedral Al sites in MEPSA-3 is of great importance. This is because the catalytic activity of an aluminosilicate catalyst is mainly based on its acidity which is directly related various aluminum sites. It is known that a tetrahedral aluminum site generates Bronsted acidity which is responsible for a cracking catalytic reaction; while an octahedral aluminum site is usually connected to Lewis acidity which is often involved in coke formation. For a FCC catalyst, it is desirable to maximize and stabilize tetrahedral Al sites while reducing octahedral Al sites as much as possible. This is exactly what happened in MEPSA-3.

MEPSA-3 can be used in preparing cracking catalysts containing zeolite y in an inorganic matrix using the "incorporation" technology described in copending U.S. Ser. No. 08/754,609 (WO 97/21785) Madon et al., the teachings of that application are incorporated herein by cross-reference. Briefly, zeolite y is slurried in water with hydrous kaolin and MEPSA-3 and a silica sol binder. The slurry is spray dried and the resulting microspheres are ion-exchanged and heat treated. The post-treatment with a phosphate or phosphite salt, disclosed in said copending application, is optional.

Example 7

This example shows that MEPSA-3 can be made by using different acids at different concentration, reaction time and temperature. 200 g of F100 clay was added to 2 liters of 2M $H_2C_2O_4$, aqueous solution at 95° C. for 24 hours with stirring. The slurry was filtered and washed with deionized water three times, and dried at 105° C. overnight. The resulting material has a BET surface area of 372 $M^2$/g, pore volume of 0.80 cc/g, and pore size of about 86 Å in diameter. The material contains about 88.7 wt % of $SiO_2$ and 3.4 wt % of $Al_2O_3$. $^{27}Al$ NMR again indicates that all the octahedral aluminum sites have been removed. After being steamed at 145° F. for 4 hours with 90% water partial pressure, the surface area and pore volume are decreased to 201 $m^2$/g and 0.66 cc/g, respectively, while the pore diameter is increased to 132 Å $^{27}Al$ NMR shows again that the steaming did not alter the tetrahedral Al sites.

Example 8

Most current commercial bentonite acid activation processes use $H_2SO_4$. This example shows that $H_2SO_4$ gives a better porosity and stability than conventional process, but not as good as $H_3PO_4$ leaching.

Table 7 lists the elemental analysis and porosity data of $H_2SO_4$-leached F100 clay under different acid concentration and reaction time. The experimental procedures are as follows: 200g of as received F100 clay was added to 2 liter $H_2SO_4$ aqueous solution. After a period of time at 95° C. with stirring, the slurry was filtered and washed with hot de-ionized water for three times, and dried at 105° C. overnight.

The data in Table 7 indicate that $H_2SO_4$ is as efficient as $H_3PO_4$ in removing aluminum, but not as good in creating porosity. For example, at 3M and 8 hours, the $Al_2O_3$ and BET surface area for $H_3PO_4$ are 3.2 wt % and 485 $m^2$/g as compared to 4.4 wt % and 296 $m^2$/g for $H_2SO_4$. BET surface area and pore volume of the steamed $H_2SO_4$-leached samples are lower than that of $H_3PO_4$. For example, after a steaming at 1450° F. and 90% water partial pressure for 4 hours, the $H_2SO_4$-leached sample has a surface area and pore volume of 148 $m^2$/g and 0.57 cc/g as compared to 204 $m^2$/g and 0.61 cc/g of $H_3PO_4$-leached. However, $^{27}Al$ NMR indicates that, after $H_2SO_4$-leaching and steaming, the residual tetrahedral aluminum sites remain intact.

Example 9

In this example, the starting material was a commercial acid-activated bentonite obtained by a conventional mild $H_2SO_4$ acid leaching. This acid-activated bentonite is supplied under the tradename F-160 by Engelhard Corporation.

Table 8 lists the porosity and elemental analysis data of F-160 after further leaching with sulfuric acid. The acid-leaching procedures were the same as example 8 except that as-received F160 was used. F160 has an $Al_2O_3/SiO_2$ content of 10.8/73.0 wt %, BET surface area of 334 $m^2$/g, pore volume of 0.49 cc/g, and pore diameter of 58 Å.

There are two trends emerging from the data in Table 8. First, it takes much shorter time for F-160 to reach its maximum porosity (pore volume) than F100. For example, at 1 M acid concentration, it needs 14 hours for F100 but 6 hours for F160 to reach their pore volume maximum. At 3M concentration, it takes 8 hours for F100 but 2 hour for F160 to reach their pore volume maximum. Secondly, the maximum pore volume for leached-F100 is higher than leached-F160 sample. For example, at 1M concentration, it is 0.71 cc/g for F100 and 0.58 cc/g for F160.

TABLE 7

Porosity and composition of $H_2SO_4$-leached F100

| Conc. (M) | Time (hr) | $Al_2O_3/SiO_2$ (wt %) | BET ($m^2$/g) | PV (cc/g) | PS (Å) |
|---|---|---|---|---|---|
| 1 | 12 | 12.9/78.9 | 409 | 0.59 | 57 |
|   | 14 | 11.8/80.6 | 398 | 0.71 | 71 |
|   | 16 | 10.2/82.4 | 388 | 0.59 | 60 |
|   | 18 | 9.0/80.8 | 304 | 0.53 | 69 |
| 3 | 3 | 9.2/83.7 | 359 | 0.60 | 67 |
|   | 4 | 7.6/87.3 | 343 | 0.63 | 74 |
|   | 5 | 5.1/88.8 | 310 | 0.68 | 86 |
|   | 8 | 4.4/90.8 | 296 | 0.86 | 115 |
|   | 10 | 3.3/90.1 | 251 | 0.86 | 138 |

TABLE 8

Porosity and Composition of $H_2SO_4$-Leached F160

| Conc. (M) | Time (hr) | $Al_2O_3/SiO_2$ (wt %) | BET ($m^2$/g) | PV (cc/g) | PS (Å) |
|---|---|---|---|---|---|
| 1 | 4 | 7.6/83.6 | 386 | 0.56 | 58 |
|   | 6 | 6.3/84.2 | 367 | 0.58 | 63 |
|   | 8 | 5.9/84.7 | 338 | 0.55 | 65 |
| 3 | 1 | 8.2/82.8 | 354 | 0.53 | 60 |
|   | 2 | 6.4/85.6 | 339 | 0.57 | 67 |
|   | 3 | 5.3/84.0 | 277 | 0.52 | 75 |

What is claimed:

1. A method for producing an amorphous mesoporous silicoaluminate containing at least 0.5 weight percent aluminum from a calcium bentonite clay mineral containing octahedral and tetrahedral aluminum in the framework of the mineral, which comprises mixing said calcium bentonite clay with sufficient acid to leach substantially all of said octahedral aluminum without removing tetrahedral aluminum as determined by using $^{27}Al$ NMR to determine that tetrahedral aluminum has not been removed.

2. The method of claim 1, wherein the acid is a mineral or organic acid.

3. The method of claim 1, wherein the acid is phosphoric.

4. The method of claim 3, wherein the concentration of said phosphoric acid is in the range of 1 to 6M.

5. The method of claim 1, wherein aluminum is leached at a temperature of 20° to 100° C.

6. The method of claim 3, wherein the residue of phosphoric acid after leaching is washed with sufficient water to reduce the level of phosphorous to below 1.0 wt %, expressed as P2O5.

7. The method of claim 1, wherein the calcium bentonite prior to leaching contains less than 2.0 wt % of iron, expressed as $Fe_2O_3$, and after leaching has a BET surface area in the range of 600–730 $m^2$/g, a pore volume in the range 0.4 to 0.8 cc/g, and pore diameter in the range of 30–60 Å unit.

8. The method of claim 1, wherein the calcium bentonite prior to leaching contains more than 5.0 wt % of iron, expressed as $Fe_2O_3$, and the leached clay has a BET surface area in the range of 300 to 500 m²/g, a pore volume in the range of 0.4 to 0.8 cc/g, and pore diameter in the range of 50 to 80 Å.

9. A mesoporous silicoaluminate residue of calcium bentonite clay having a BET surface area in the range of 600 to 730 m²/g and a pore volume in the range of 0.4 to 0.8 cc/g, a pore diameter in the range of 30–60 Å units, said residue containing tetrahedral aluminum but no octahedral aluminum.

10. The composition of claim 9 obtained from a Cheto bentonite clay.

11. A mesoporous silicoaluminate residue of calcium bentonite clay having a BET surface area in the range of 300 to 500 m²/g, a pore volume in the range of 0.4 to 0.8 cc/g and a pore diameter in the range of 50 to 80 Å units, said residue containing tetrahedral aluminum but no octahedral aluminum.

12. The composition of claim 11 obtained from Fowlkes clay.

* * * * *